United States Patent [19]

Hanaoka

[11] 4,141,052
[45] Feb. 20, 1979

[54] ERASE HEAD

[75] Inventor: Naohiro Hanaoka, Hachioji, Japan

[73] Assignee: Olympus Optical Co., Ltd., Tokyo, Japan

[21] Appl. No.: 782,896

[22] Filed: Mar. 30, 1977

[30] Foreign Application Priority Data

Apr. 6, 1976 [JP] Japan .................................. 51-38462

[51] Int. Cl.$^2$ .............................................. G11B 5/12
[52] U.S. Cl. .................................................. 360/118
[58] Field of Search ................... 360/118, 66; 29/603, 29/607

[56] References Cited

U.S. PATENT DOCUMENTS

| 3,427,710 | 2/1969 | Williams | 29/607 |
| 3,947,891 | 3/1976 | Saito | 360/118 |

*Primary Examiner*—Robert S. Tupper
*Attorney, Agent, or Firm*—Ostrolenk, Faber, Gerb & Soffen

[57] ABSTRACT

An erase head comprises a magnetizable material which can be magnetized into a permanent magnet having N- and S-poles. The magnetization takes place in a manner such that one of the poles which is the first to be contacted by a magnetic medium to be erased is magnetized to produce a field strength which is less than the magnetic field strength produced by the other pole.

1 Claim, 4 Drawing Figures

ERASE HEAD

BACKGROUND OF THE INVENTION

The invention relates to a magnetic erase head formed by a permanent magnet, which comprises a permanent magnet material such as ferrite.

Various forms of magnetic erase heads are known and used in magnetic recording and reproducing apparatus, including (a) d.c. type in which either the coil of the head is fed with a direct current or a permanent magnet is used to magnetize a magnetic medium to its saturation;

(b) a.c. type in which the coil of the head is fed with a current of a frequency which is several times higher than the maximum frequency recorded to reduce the remanent flux in the magnetic medium substantially to a zero level;

(c) the use of a permanent magnet material which is magnetized to produce alternate poles of opposite polarities so that at the end of travel of the magnetic medium across the poles, the field strength of the magnet converges to zero, achieving an effect similar to the a.c. erasure; and (d) an initial erasure by an erase head to the saturation, followed by the application of a d.c. field of the opposite polarity by a record head to compensate for the offset created by the saturation effect, thus achieving substantially the same effect as the a.c. erasure.

The technique (a) suffers from large erasing noises and distortion, and the technique (b) involves an increased power dissipation, which renders it inadequate for use in a tape recorder of portable type. The technique (c) requires the provision of five or seven poles, resulting in a bulky construction. Additionally, their manufacture is expensive in that the successive poles must be magnetized to sequentially decreasing levels. Finally, the technique (d) employs a head which is also used for record and playback operation and having a small gap length on the order of one micron, which may cause an increased distortion when the d.c. current is applied to the head.

In a so-called miniature cassette tape recorder which is designed to be received in a pocket of a shirt, the erase head has a width which is 2.1mm at maximum the tape cassette is comparable in size to a packet of matches. The contact between the head and the tape can only be maintained over a length of 0.8 mm. With such a recorder, the available erase head is dimensionally limited to the types (a) and (d).

SUMMARY OF THE INVENTION

It is an object of the invention to provide a magnetic erase head, particularly useful in a miniature cassette tape recorder, which avoids the disadvantages of the prior art by using a magnetizable material magnetized to provide a pair of N- and S-poles of differential magnetization.

The differential magnetization of the pair of poles of the erase head permits an erasure to zero level, improving the signal-to-noise ratio. A magnetic erasure can be attained free from nosies and distortions. Since the head has only two poles, it can be made small enough to be useable in a miniature tape recorder where the available space is at a premium.

Simultaneously with the erasure by the erase head, a separate record head may be supplied with an a.c. bias current of a magnitude which is slightly below or above 10 percent of a normal value, to cause a natural magnetization in random directions, improving the distortion during the recording operation.

DETAILED DESCRIPTION OF PREFERRED EMBODIMENT

Figure 1:
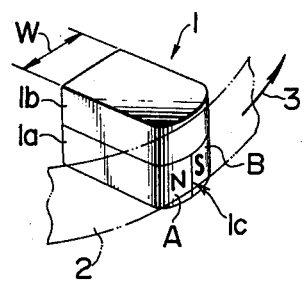
FIG. 1 is a perspective view of the erase head constructed in accordance with one embodiment of the invention.

Referring to FIG. 1, there is shown a magnetic erase head 1 constructed in accordance with the invention. The head 1 includes a lower portion 1a of a permanent magnet material such as ferrite, which is finished to a final head form, and an upper portion 1b of non-magnetic ferrite or plastic material which has a hardness and abrasion resistance closely related to those of the magnet material. The portion 1b serves as a tape guide, and the two portions are adhesively bonded together into a unitary construction. A magnetic medium or tape is shown in phantom line 2, and it will be noted that it is erased only in a region which passes over the lower portion 1a.

A pair of N- and S-poles A, B are formed in the surface 1c of the lower portion 1a which is contacted by the tape 2. These poles are differentially magnetized in that one of them which is the first to be contacted by the tape 2 is magnetized to produce a field strength which is less than the magnetic field strength produced by the other pole. By way of example, when the tape 3 travels in the direction indicated by an arrow 3, the N-pole A located on the left-hand side is magnetized to produce a field strength which is less than that of the S-pole B.

Figure 2:
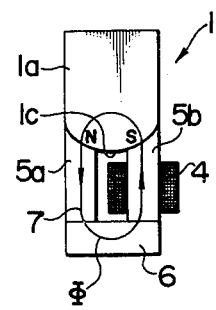
FIG. 2 is a top view of the head as it is magnetized.
Figure 3:
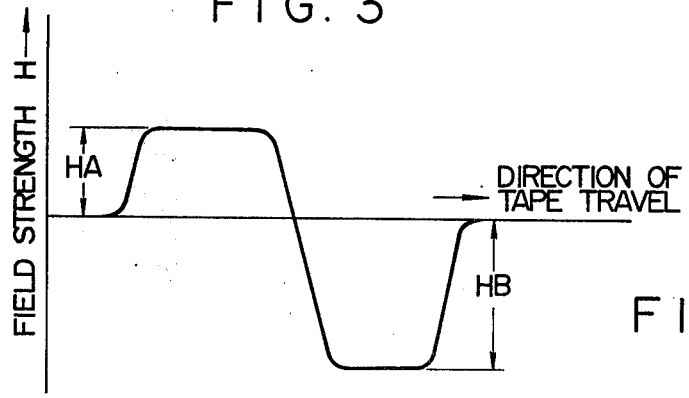
FIG. 3 graphically shows the field strength of the respective poles of the head, the graph showing the distribution of the field strength as developed along the direction of tape travel.

The differential magnetization can be achieved by using an arrangement as shown in FIG. 2 which comprises a magnetizing coil 4 and a pair of pole pieces 5a, 5b. As shown, one end of the respective pole pieces 5a, 5b is shaped in conformity to the surface 1c of the head 1, while the other end of the pole pieces is interconnected by a coupling piece 6. The pieces 5a, 5b and 6 are formed of a high permeability core material, and the coil 4 is disposed around the pole piece 5b. When the ends of the pole pieces are held in abutment against the head surface 1c and a magnetizing current passed through the coil, a magnetic flux $\phi$ is produced which follows a path indicated by an arrow 7, creating an N- and an S-pole on the left- and right-hand sides of the surface 1c, as shown. Because the coil 4 is disposed on the pole piece 5b located adjacent to the S-pole, this pole B is magnetized to a greater degree than the other pole A. It will be noted that the coupling piece 6 which is provided for purpose of connection may be omitted. The shape of the pole pieces 5a, 5b is chosen so that a uniform ratio HA/HB of the magnetic fields of the respective poles be maintained. FIG. 3 shows the distribution of the magnetic field along the head surface, as viewed in the direction of tape travel.

Figure 4:
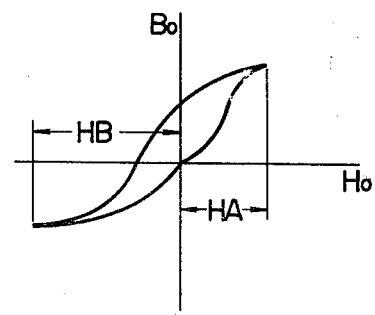
FIG. 4 graphically shows the magnetization curve of a magnetic tape which is erased by the erase head.

FIG. 4 graphically illustrates a magnetization curve which a tape 2 will experience as it is erased by the head 1 of the invention. As usual, the abscissa represents the field strength H$o$ and the ordinate the flux density B$o$. As will be seen, the tape is initially magnetized by the field strength HA of the pole A, and then magnetized by the field strength HB of the pole B. When the tape moves away from the head 1 subsequently, it is subjected to zero field and the magnetization of the tape is reduced to zero. By choosing a suitable uniform value for the ratio HA/HB, the remanence can be reduced substantially to zero in the similar manner as achieved with the a.c. erasure.

What is claimed is:

1. An erase head for a recording/playback device having a magnetic medium which may be moved into engagement with said erase head and passed with respect thereto; said erase head comprising a permanent magnet having a surface over which said magnetic medium is passed; said surface of said permanent magnet having a pair of poles of opposite polarity; the magnetic medium passing in a direction with respect to the erase head in which it passes successively over the poles; the pole which is first to be reached by said magnetic medium having a lesser magnetic field strength than the magnetic field strength of the other pole.

* * * * *